United States Patent [19]

Wilkes

[11] Patent Number: 5,832,235

[45] Date of Patent: Nov. 3, 1998

[54] SYSTEM AND METHOD FOR PATTERN MATCHING USING CHECKSUMS

[75] Inventor: John Wilkes, Palo Alto, Calif.

[73] Assignee: Hewlett-Packard Co., Palo Alto, Calif.

[21] Appl. No.: 824,536

[22] Filed: Mar. 26, 1997

[51] Int. Cl.$^6$ .................................................. G06F 13/00
[52] U.S. Cl. ...................................................... 395/200.77
[58] Field of Search ........................ 364/DIG. 1, DIG. 2; 341/65, 50; 370/474, 477; 371/31, 32, 5.1; 395/200.3, 200.58, 200.61, 200.62, 200.63, 200.64, 200.77

[56] References Cited

U.S. PATENT DOCUMENTS 5,150,368  9/1992  Autruong et al. ...................... 371/31
5,293,379  3/1994  Carr ....................................... 370/474

*Primary Examiner*—Robert B. Harrell

[57] ABSTRACT

A method for detecting that a vector matches a pattern compares a checksum for the vector to a precomputed checksum that acts as a signature for the pattern.

Other systems and methods are disclosed.

27 Claims, 6 Drawing Sheets

SYSTEM AND METHOD FOR PATTERN MATCHING USING CHECKSUMS

FIELD OF THE INVENTION

The present invention pertains to pattern matching, and in particular to a method and system for using precomputed checksums to detect certain expected patterns.

BACKGROUND OF THE INVENTION

In many computer system applications it is valuable to detect particular vector patterns. A vector is, for example, a file system page, a cache page, a memory page, a page of output data or input data, or a data block transmitted between two networked devices. In some applications it is very valuable to be able to detect the occurrence of particular vectors. For example, it is useful to detect pages that are completely blank, a page filled with zeros (a zero-filled page), and test patterns.

It is valuable to be able to detect particular pattern vectors, for example, to avoid storing an entire zero-filled page, but rather to store only a flag that indicates that the page is a zero-filled page. The rest of the storage that would otherwise store a vector of zeros can be used to store other valuable information. Similarly, in a communications system, if a particular vector pattern is detected by the sender, it can send an indicator of such a vector rather than the entire vector.

Present solutions to the problem of detecting zero-filled pages is to scan each entire page to determine that each byte in the page contains a zero. If a non-zero value is found, the scan is aborted. If the scan reaches the end of the page, it is known that the page is a zero-filled page. If so, an appropriate action can be taken, such as discarding the page or marking it as a "hole" in the file or storage system. Reading such a "hole" results in the creation of a zero-filled page.

To detect other patterns, a page that is a candidate for matching the pattern is scanned byte-by-byte to determine if each byte contains the value expected for that byte in the pattern.

The disadvantages of the scan-the-page method of detecting data patterns include that it is expensive in terms of processor time and compute cycles and in terms of bandwidth required to read and write pages from memory or other devices. Furthermore, scanning the pages can result in cache pollution caused by bringing a page to be scanned into the cache. Following the cache replacement scheme, the data from the cached pages would displace previously cached data—potentially more interesting data—from the cache, and, thus, resulting in degraded processor performance.

Because of these disadvantages, the detection of particular pattern vectors is usually not done.

It would be desirable to have a method of detecting vector patterns that avoid these overhead problems. Ideally such a method should utilize mechanisms that are used for other purposes, thereby avoiding most overhead associated with detecting vector patterns.

SUMMARY

According to the present invention, a vector pattern is detected by comparing the checksum for the vector with a precomputed checksum. Such a checksum may be a checksum computed to verify the integrity of data communicated over a computer network. Examples include the checksum in a TCP/IP message.

If the checksum matches a precomputed checksum, the vector is scanned to verify that there indeed is a pattern match. If the checksum does not match the precomputed checksum, the vector cannot match the pattern.

If a pattern match is detected, that fact can be used in a data communications embodiment of the invention to avoid sending an entire vector. Similarly, in a data storage embodiment of the invention, that fact would be used to avoid storing the entire vector. Rather, only an indication of the pattern match is communicated or stored, respectively.

In an alternative embodiment, as a checksum is computed or tested, each word in the vector is compared against a particular stored word. If any word in the vector does not match the particular stored word, the method of the alternative embodiment has detected that the vector does not match the pattern.

DETAILED DESCRIPTION OF THE PREFERRED EMBODIMENTS

Figure 1:
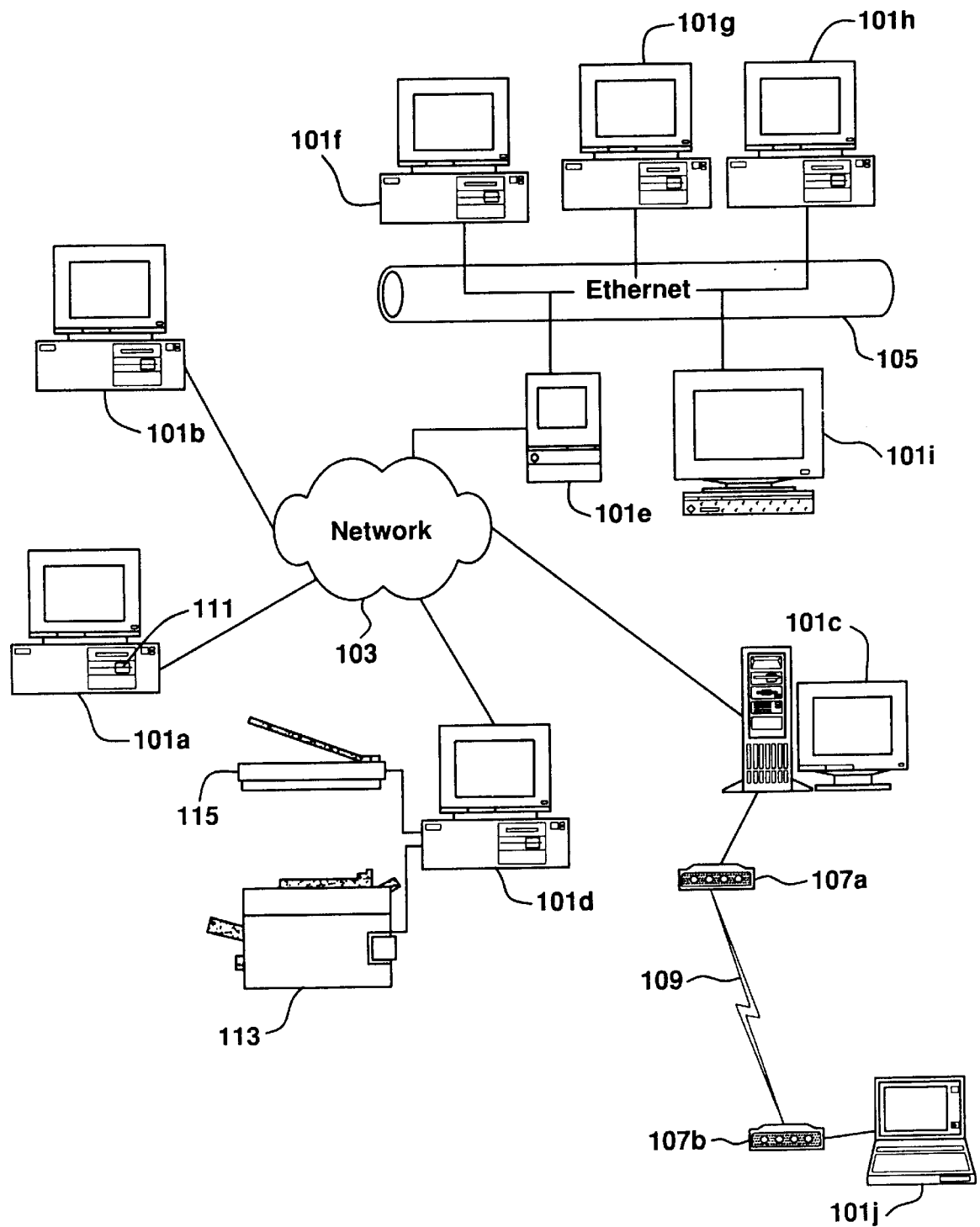
FIG. 1 is a schematic of a computer network including a number of networked devices.

As shown in the drawings for purposes of illustration, the invention is embodied in a method for detecting vector patterns, for example, zero-filled pages, using checksums that are calculated for other purposes. The method of the present invention thereby avoids expending computing and memory resources for the purpose of detecting particular pattern vectors.

In accordance with the invention, a particular pattern vector is detected by comparing a checksum that is calculated for another purpose to precomputed and stored checksums that correspond to vector patterns that need to be detected.

FIG. 1 is an illustration of an exemplary hardware configuration of a distributed computing environment. A number of computers 101(a–j) are connected to one another via a network 103 and intermediate computers. Some of these computers (101e–i) are connected to a local area network 105. This local area network 105 is further connected, via an intermediary router or computer 101e to a wider area network 103. The wider area network 103 could, for example, be a corporate intranet or the Internet. Other computers, e.g., computer 101j, may be connected to the other computers in the network via a telecommunications link 109. This communications link 109 is established by modems 107a and 107b which are connected to computers 101c and 101j, respectively. An infinite number of other possible combinations of computers and connections are possible, and the illustration in FIG. 1 should only be taken as an example.

Most, if not all, of the computers 101 contain or are attached to some form of data storage media, e.g., a disk drive 111. Furthermore, the computers 101 may also be attached to one or more input devices 115, which may for example be a scanner, and to output devices 113, which may for example be a printer.

Figure 2:
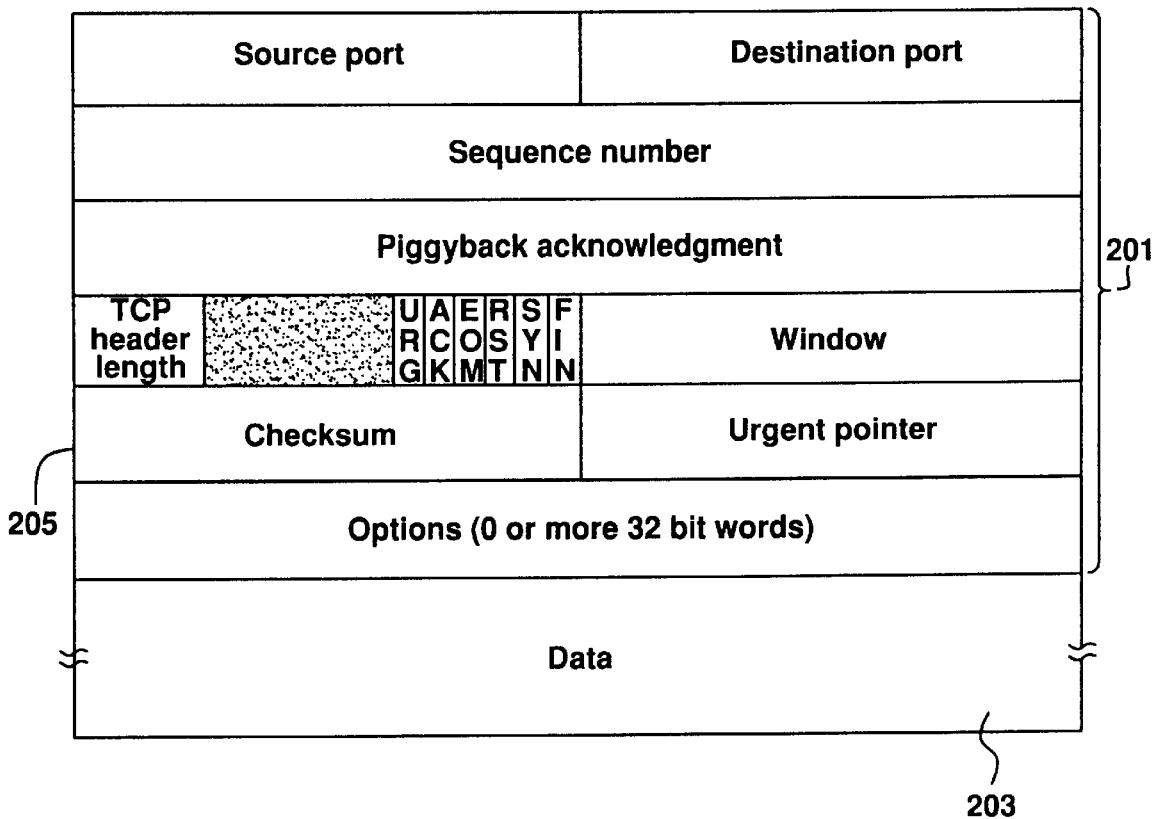
FIG. 2 is a block diagram of a TCP datagram.

FIG. 2 is a block diagram of a TCP datagram 200. TCP—Transmission Control Protocol—is a communication protocol used in communicating data over the Internet. TCP is described herein for illustrative purposes. The present invention is applicable to any communications protocol or data storage system that utilizes checksums. Such alternative applications include UDP and AAL (ATM Adaptation Layer).

A TCP datagram 200 is composed of a TCP header 201 and a data block 203. The TCP header contains a variety of fields including a checksum field 205. When being transmitted in a computer network according to the TCP protocol data is organized according to the datagram 200. For each transmission the checksum is examined. A TCP checksum is computed by adding up all the data in a packet, regarded as 16-bit words, and taking the one's complement of the result. A checksum is typically used in a communications system to verify the accuracy of data received. If the checksum computed from the received data does not correspond to the data stored in the checksum field 205, the recipient can reject the packet as being corrupted.

According to the present invention, vector patterns (e.g., the data vector stored in the data field 203 of a TCP message) are detected by comparing the checksum to precomputed checksums for specific vector patterns. An example of such a vector pattern is a field entirely composed of zero bytes (a zero-filled vector).

The same data always produces the same checksum. Therefore, a checksum is "signature" of the data stored in a packet. Therefore, it is possible to precompute checksum that corresponds to each vector pattern which needs to be detected.

Figure 3:
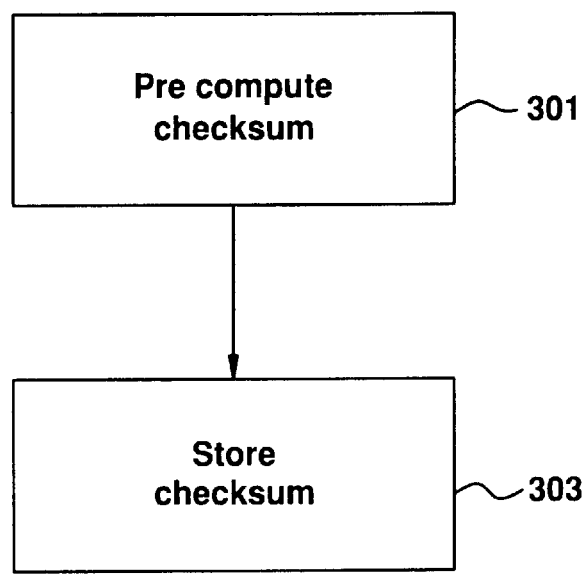
FIG. 3 is a flow chart illustrating a method of the invention for precomputing of checksums for particular vector patterns.

FIG. 3 is a flow chart illustrating the precomputation of checksums for vector patterns to be detected. The procedure is repeated for each vector pattern which should be quickly detected. A first step is to compute a checksum, step 301. Checksums may be computed according to any known method, e.g., cyclic redundancy check (CRC) or by adding up each word and taking the one's compliment of the result.

The second step, of the precomputation of checksums, is to store the resulting checksum into a checksum data base, step 303. The checksum data base may be a conventional data base or a file. If relatively few vector patterns are checked for, the precomputed checksums may be stored in registers. For example, in the preferred embodiment, zero-filled pages are primarily checked for. The checksum corresponding to a zero-filled page may be hardwired in some pattern matching hardware, thereby providing for very quick checking for zero-filled pages.

A checksum is a function of both the contents and length of a data field. Therefore, the procedure of FIG. 3 is repeated for each vector pattern and length pairing.

Figure 4:
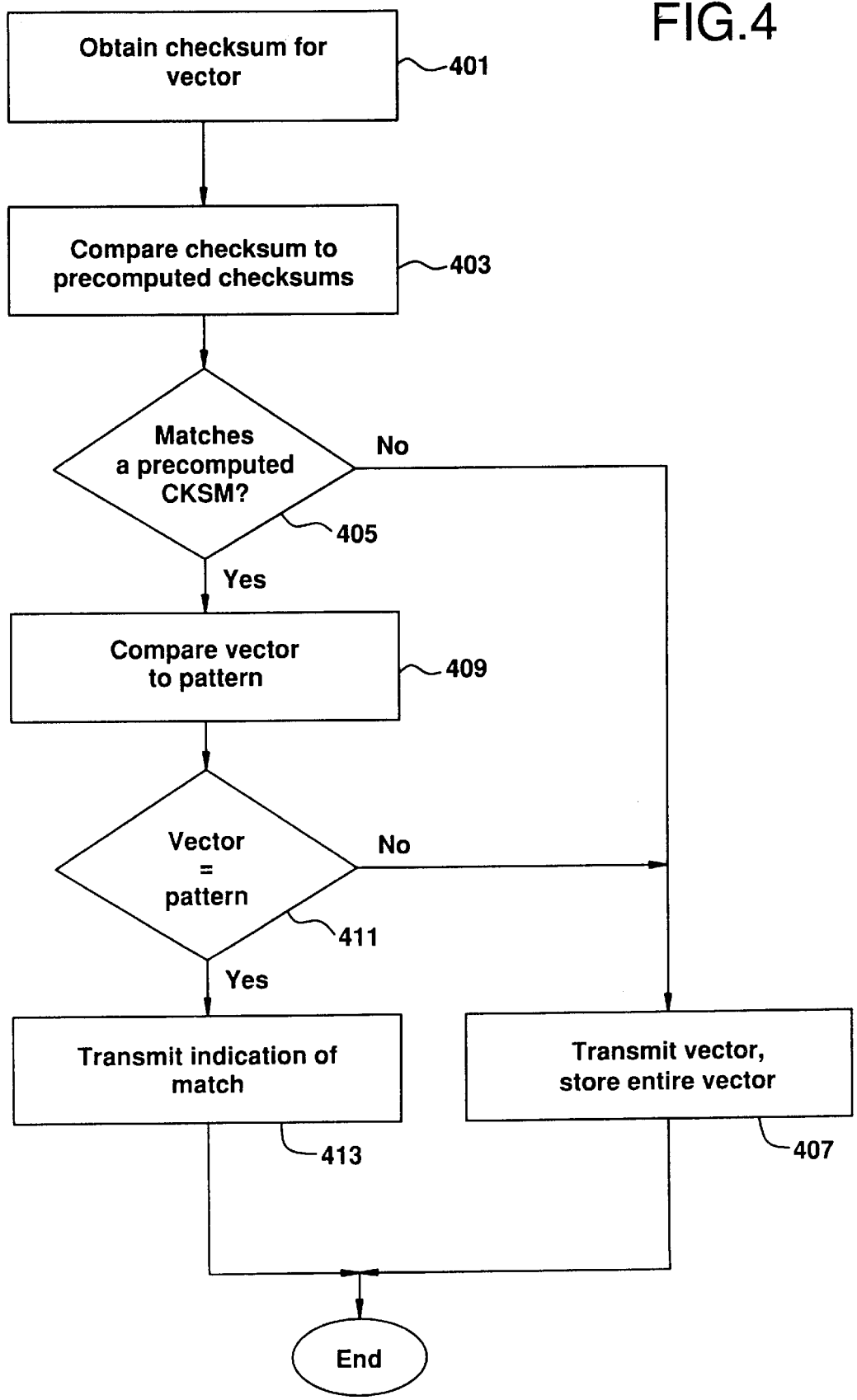
FIG. 4 is a flow chart illustrating a method of the invention of checking for particular vector patterns by examining checksums for such patterns.

FIG. 4 is a flow chart illustrating the detection of particular vector patterns according to the method of the present invention. For each candidate vector that should be checked for pattern matching, the checksum for the vector is obtained, step 401. In some embodiments, the checksum is obtained by computing it. The checksum should be computed according to the same algorithm as used to compute the precomputed checksums that have been stored in the checksum database.

However, in the preferred embodiment, checksums are computed for some other purpose. For example, in the Internet communications application of the invention, checksums are computed for each TCP message and stored in the checksum field 205. Therefore, in that application, the checksum is obtained by simply extracting it from the checksum field 205.

Because checksums are often a required computation, in many systems there is hardware support for computing and testing checksums. One example of such a device is the checksum engine in a DMA (Direct Memory Access) channel.

The computed checksum is next compared to each precomputed checksum, step 403. If the checksum does not match a precomputed checksum, step 405, then some action is taken. For example, in the case of data transmission, the vector may be transmitted in its entirety, step 407. Or if the application is a cache or data storage device, the entire page may be stored.

There is a many-to-one correspondence between data contents and checksums. Therefore, there is a chance that the checksums match even if the vector does not match the desired pattern. Accordingly, if the checksum matches one of the precomputed checksums, step 405, the vector is actually checked for the pattern, step 409. This check to determine if the vector contents matches the pattern may be done using a byte-by-byte scanning of the vector contents.

If the vector does not match the pattern, step 411, e.g, if the vector is not a zero-filled page, the required action is taken, step 407. Otherwise, some action that is based upon the fact that the vector matches the pattern can be taken, step 413. That action can be to store an indication that a page matches the particular pattern, for example, that the page is a zero-filled page.

By checking for vector patterns by using the checksum according to the method of the present invention, much of the overhead associated with scanning pages for patterns can be avoided. Thus, the invention provides at least the following advantages over existing methods of detecting vector patterns: it provides a very quick and computationally cheap way of avoiding checking most vectors, thereby saving on CPU cycles, memory bandwidth, cache pollution, and execution time.

The invention is inexpensively incorporated into existing schemes of checking for vector patterns. In many applications for the invention, checksums are already computed for another purpose using hardware for checksum computation and testing. Therefore, there is very little overhead associated with implementing the method of the present invention.

The method of the present invention may be employed in many applications. For example, it may be used in the transmission of data over a computer network, e.g., like the one shown in FIG. 1. When a message (e.g., a TCP message) is transmitted both the transmitting computer, receiving computer and any intervening routers, compute checksums to verify that the transmitted data has not been corrupted en route. In a computer network modified to incorporate the present invention, each such computer can then compare the checksum against precomputed checksums. As soon as the computation of the checksum and additional pattern matching has been completed, if the vector contains data matching the pattern, some actions can be taken even before the data has been transmitted. The action taken might include deleting the data portion of the message from the sender, thereby freeing up space, or replacing a long outgoing message with a short message that is indicative of the pattern match (e.g., a message saying "here comes a zero-filled page" or "here comes a test pattern").

Figure 5:
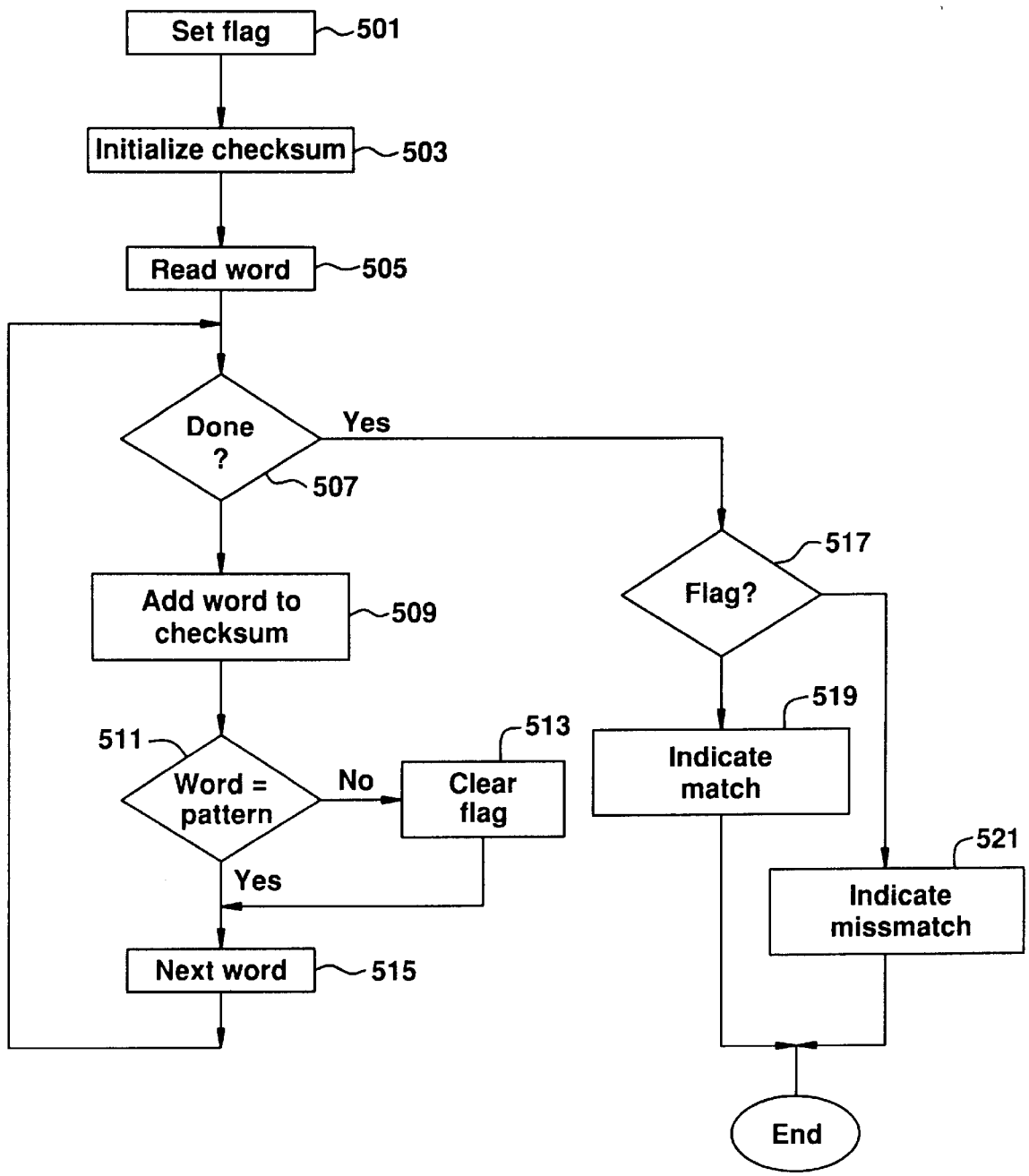
FIG. 5 is a flow chart of an alternative embodiment, in which the checksum computation or testing logic compares each word added to a checksum against a known pattern.

FIG. 5 is a flow chart of an alternative embodiment, in which the checksum computation or testing logic, in addition to computing the checksum, also compares each word added to a checksum against a known pattern. If the algorithm terminates with each word matching a pattern (e.g., a word containing the quantity zero), the logic indicates that the message contains a given pattern (e.g., a zero-filled page). In step 501, a flag is set. The flag is used to indicate that all words in a message match a given pattern.

Next, the checksum is initialized, step 503.

Next, a data word is read from the data portion of the message, step 505. If attempting to read a word does not result in an end-of-data condition, step 507, the read word is incorporated into the checksum, step 509.

Next, the word is compared to a stored pattern, step 511. For example, if the method is used to detect a zero-filled page, the word is checked to determine if it contains the value zero. Many computers contain branch instructions for comparing a word to the quantity zero. Thus, this check can be done very fast on such computers.

If the word does not contains the given value, the flag is cleared, step 511.

Next, the next word is read, step 513. If the process of reading a word does not indicate an end-of-data condition, step 507, the loop 509 through 515 is repeated. Otherwise, when the end-of-data condition has been encountered in step 507, the flag is checked, step 517. If the flag is set, a pattern match is indicated, step 519. If the flag is clear, a pattern mismatch is indicated, step 521.

Thus, if the checksum calculation or testing logic according to the method of FIG. 5 concludes with the flag set, all words held in the message have the same value. In an alternative embodiment, the value checked against is the value of the first word in the data field. In this embodiment, only a one word long data field is transmitted whenever a pattern match has been detected. A positive indicator is taken by the recipient to mean that all words in the data field has the same value as the one word that was transmitted.

Figure 6:
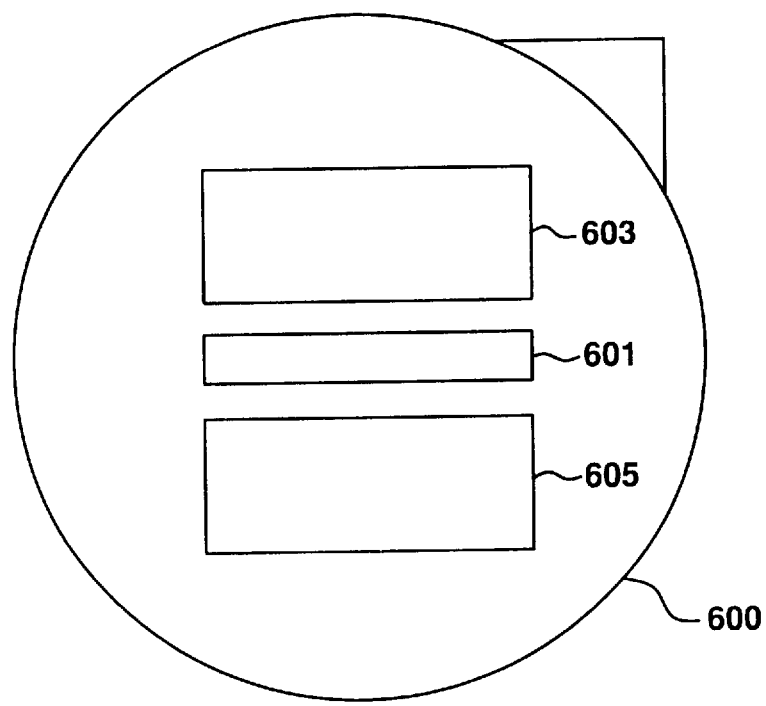
FIG. 6 is a schematic illustrating a storage device containing computer programs implementing the methods of the present invention.

FIG. 6 is a schematic illustrating a storage device containing computer programs implementing the methods of the present invention. A storage device 600 contains a computer program 601 that is an implementation of the method of FIG. 3. The storage device 601 also contains a computer program 603 or 605 that are an implementations of the methods of FIG. 4 and of FIG. 5, respectively. In an alternative embodiment, the storage device 601 contains only one of computer programs 601, 603, or 605, or any combination thereof. Each of computer programs 601, 603, and 605 contain instructions that cause a computer 101 to operate according to the corresponding method.

The computer storage device 600 can be any of a large variety of storage devices. Examples include hard disk drives, floppy disk drives, read only memory (ROM), electrically programmable read only memory (EPROM), magnetic tape, logic circuits, etc. A program 601, 603, or 605 may also be delivered over a computer network, for example the Internet.

Although several specific embodiments of the invention have been described and illustrated herein, the invention is not to be limited to the specific forms or arrangements of parts so described or illustrated. The invention is limited only by the claims.

I claim:

1. A computer readable storage media comprising instructions for controlling the operation of a computer system, including instructions for:

determining a checksum for a vector to be transmitted;

comparing the checksum with the stored checksums;

if the checksum matches one of the stored checksums, determining if the vector matches the pattern corresponding to the checksum, and if the vector matches the pattern, transmitting an indication of the match;

receiving data packets on the data link; and analyzing a received data packet to determine if the received packet is an indication that a vector matched a known pattern.

2. The computer readable storage media of claim 1, further including instructions for:

while computing a checksum comparing each word in the vector to a particular value; and if each word in the vector matches the particular value, transmitting only an indication of such matching.

3. The computer readable storage media of claim 2, further comprising instructions for discarding a vector matching the pattern and storing an indication that the vector matches the pattern.

4. The computer readable storage media of claim 3, further comprising instructions for detecting an indication that a vector matches the pattern and for creating the vector.

5. The computer readable storage media of claim 2, wherein the particular value is zero.

6. The computer readable storage media of claim 2, wherein the particular value is the value stored in the first word of the vector.

7. The computer readable storage media of claim 1, wherein the instructions for determining a checksum, comprises:

reading the checksum from a field in a communications message.

8. A method of detecting a particular data pattern in a vector in a computer system, comprising:

storing a value corresponding to a checksum for the data pattern;

obtaining a checksum for a vector;

comparing the checksum and the stored value; and if the checksum is not equal to the stored value, indicating that the vector does not match the data pattern.

9. The method of claim 8, wherein the step of obtaining a checksum comprises:

receiving the checksum from another device.

10. The method of claim 9, wherein the step of obtaining a checksum comprises:

receiving the checksum as a field in a communications message.

11. The method of claim 10, wherein the communications message is a message selected from the set including a TCP message, a UDP message, and an AAL message.

12. The method of claim 8, further comprising:

if the checksum is equal to the stored value, comparing the vector to the particular data pattern; and if the vector matches the data pattern, indicating that the vector matches the data pattern;

otherwise, indicating that the vector does not match the data pattern.

13. The method of claim 12, wherein the particular data pattern is a vector wherein all words have the same value and wherein that value is stored in a storage location.

14. The method of claim 13, wherein the value equals a value stored in the first word in the vector.

15. The method of claim 8, wherein the data pattern is a zero-filled page.

16. The method of claim 8, wherein the step of obtaining a checksum comprises:

computing the checksum.

17. A method of detecting zero-filled pages in a computer system, comprising:

storing a value corresponding to a checksum for a zero-filled page;

obtaining a checksum for a page;

comparing the checksum to the value;

if the checksum is not the same as the value, indicating that the page is not a zero-filled page; and if the checksum is the same as the value:

scan the page for non-zero data values;

if all the data values in the page are zero, indicating that the page is a zero-filled page;

otherwise, indicating that the page is not a zero-filled page.

18. The method of claim 17, wherein the step of obtaining a checksum further comprises:

retrieving the checksum from a field in a communications message.

19. The method of claim 18, wherein the communications message is selected from a set including a TCP message, a UDP message, and an AAL message.

20. The method of claim 17, wherein the step of obtaining a checksum further comprises:

computing the checksum.

21. A method of communicating packets of data in a network, wherein both recipients and transmitters store a checksum corresponding to at least one pattern, and wherein a data link connect transmitters to receivers, comprising:

determining a checksum for a vector to be transmitted;

comparing the checksum with the stored checksums;

if the checksum matches one of the stored checksums, determining if the vector matches the pattern corresponding to the checksum, and if the vector matches the pattern, transmitting an indication of the match;

receiving data packets on the data link; and analyzing a received data packet to determine if the received packet is an indication that a vector matched a known pattern.

22. The method of claim 21 further comprising:

upon receiving an indication that a vector matched a known pattern, creating the corresponding vector.

23. A method of detecting a particular pattern vector in a computer system, comprising:

while computing a checksum for a vector, comparing each word in the vector to a particular value;

if all words in the vector match the particular value, indicating that the vector matches a pattern having all words equal to the particular value; and if any word in the vector fails to match the particular value, indicating that the vector is not a match for the pattern.

24. The method of claim 23, wherein the particular value is zero.

25. The method of claim 23, wherein the particular value is a value contained in the first word in the vector.

26. The method of claim 23, further comprising:

if all words in the vector match the particular value, transmitting only the indication of the pattern match, and not transmitting the contents of the vector.

27. The method of claim 23, further comprising:

if all words in the vector match the particular value, storing only an indication of the pattern match and not storing the contents of the vector.

* * * * *